US012739434B2

(12) United States Patent
Park et al.

(10) Patent No.: US 12,739,434 B2
(45) Date of Patent: Sep. 15, 2026

(54) DEVICE FOR ENCODING MULTI-CHANNEL IMAGE

(71) Applicant: KOREA ELECTRONICS TECHNOLOGY INSTITUTE, Seongnam-si (KR)

(72) Inventors: Woo Chool Park, Incheon (KR); Jun Hwan Jang, Goyang-si (KR); Jin Wook Yang, Uijeongbu-si (KR); Minsu Choi, Seoul (KR); Junsuk Lee, Seoul (KR); Bonjae Koo, Suwon-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 0 days.

(21) Appl. No.: 19/006,891

(22) Filed: Dec. 31, 2024

(65) Prior Publication Data

US 2025/0142119 A1 May 1, 2025

Related U.S. Application Data

(63) Continuation of application No. PCT/KR2022/017883, filed on Nov. 14, 2022.

(30) Foreign Application Priority Data

Aug. 18, 2022 (KR) ........................ 10-2022-0103042

(51) Int. Cl.
*H04N 19/597* (2014.01)
*H04N 19/127* (2014.01)
(Continued)

(52) U.S. Cl.
CPC ......... *H04N 19/597* (2014.11); *H04N 19/127* (2014.11); *H04N 19/157* (2014.11); *H04N 19/172* (2014.11)

(58) Field of Classification Search
CPC .. H04N 19/597; H04N 19/127; H04N 19/157; H04N 19/172; H04N 19/436;
(Continued)

(56) References Cited

U.S. PATENT DOCUMENTS 6,275,536 B1 * 8/2001 Chen ................ H04N 21/23655
382/234
6,859,496 B1 * 2/2005 Boroczky ............. H04N 19/61
375/E7.22
(Continued)

FOREIGN PATENT DOCUMENTS

KR 10-2002-0075619 A 10/2002
KR 10-0776943 B1 11/2007
(Continued)

OTHER PUBLICATIONS

International Search Report mailed Aug. 11, 2023 in International Application No. PCT/KR2022/017883, in 4 pages.

*Primary Examiner* — Marnie A Matt
(74) *Attorney, Agent, or Firm* — Knobbe, Martens, Olson & Bear, LLP

(57) ABSTRACT

Proposed is a device for encoding a multi-channel image. The device may include a collection unit for collecting, in frame units, data of a plurality of capture cards. The device may also include an encoding unit which encodes the data collected in the collection unit, by using a plurality of encoders, and which encodes according to a configuration parameter defined regardless of the interface of the capture cards. The device may further include an output unit for outputting the encoded data.

5 Claims, 4 Drawing Sheets

(51) Int. Cl.
*H04N 19/157* (2014.01)
*H04N 19/172* (2014.01)

(58) Field of Classification Search
CPC ........... H04N 21/2343; H04N 21/2389; H04N 21/43; H04N 21/439; H04N 21/44; H04N 21/4402
USPC ..................................................... 375/240.02
See application file for complete search history.

(56) References Cited

U.S. PATENT DOCUMENTS

2003/0206172 A1 11/2003 Alexander
2004/0179600 A1 9/2004 Wells et al.
2005/0207488 A1* 9/2005 Ouyang ................. H04N 19/43 375/E7.101
2013/0021437 A1* 1/2013 Liu ........................ H04N 19/85 348/43
2017/0366819 A1* 12/2017 Wu ........................ H04N 19/88
2020/0089464 A1* 3/2020 Curtis ..................... G10L 15/22
2021/0144393 A1* 5/2021 Toda .................... H04N 19/112
2021/0289240 A1* 9/2021 Ashbacher ......... H04N 21/2353

FOREIGN PATENT DOCUMENTS

KR 10-2021-0037916 A 4/2021
KR 20210037916 A * 4/2021 ............... H04N 5/92

* cited by examiner

DEVICE FOR ENCODING MULTI-CHANNEL IMAGE

CROSS-REFERENCE TO RELATED APPLICATIONS

This application is a continuation application, and claims the benefit under 35 U.S.C. § 120 and § 365 of PCT Application No. PCT/KR2022/017883, filed on Nov. 14, 2022, which claims priority to Korean Patent Application No. 10-2022-0103042 filed on Aug. 18, 2022, the contents of each of which are hereby incorporated by reference in their entirety.

NATIONAL RESEARCH AND DEVELOPMENT PROJECTS FOR SUPPORTING THIS DISCLOSURE

Project Unique Number: 1375027482
Project Number: R2020040076-0003.
Ministry Name: Ministry of Culture, Sports And Tourism
Project Management (Specialized) Agency Name: Korea Creative Content Agency
Research Project Name: Cultural Content Development Support Project
Research Project Technology: Development of AR Streaming 5G Service Technology For Realistic E-Sports Broadcasting
Contribution Rate: 1/1
Project Executing Agency Name: Korea Electronics Technology Institute
Research Period: 2020.07.01~2022.12.31

BACKGROUND

Technical Field

The present disclosure relates to a device for encoding a multi-channel image, and more particularly, to a device for encoding a multi-channel image capable of simultaneously encoding a plurality of image sources using a plurality of capture cards.

Description of Related Technology

The present disclosure is filed as a result of a national research and development project, and the information thereof is as follows.

Recently, hardware and software that may convert captured images into formats that may be recognized by computers and edit them according to activation of personal internet broadcasting are increasing.

SUMMARY

One aspect is a multi-channel image encoding device which is not limited to the type of input interfaces of capture cards and may encode images input through multi-channels.

Another aspect is a device for encoding a multi-channel image that may include a collecting section configured to collect data of a plurality of capture cards in units of frames, an encoding section configured to encode the data collected in the collecting section using a plurality of encoders, the encoding section encoding the data according to a configuration parameter defined irrespective of interface types of the capture cards, and an out-put section configured to output the encoded data.

In an embodiment of the present disclosure, the configuration parameter may be defined in the order of a video acquisition support flag, a unique number of each interface channel, a scaling type, a unique number of each video interface and channel, a pixel representation definition, an image size, a number of frames per second, a reserved space for configuration addition, an audio acquisition support flag, and an audio-related parameter.

In an embodiment of the present disclosure, the collecting section may include a plurality of single channel collectors configured to collect data of each capture card, and a synchronizer configured to synchronize data in units of frames of the single channel collectors.

In an embodiment of the present disclosure, the single channel collector may include a video frame buffer configured to store image data in units of frames, an audio frame buffer configured to store audio data in units of frames, a data frame collector configured to collect and output data stored in the video frame buffer and the audio frame buffer in units of frames, and a configuration parameter convertor configured to identify a configuration parameter of each capture card and convert it into the configuration parameter for encoding in the encoding section.

In an embodiment of the present disclosure, the encoding section may be configured such that the plurality of encoders are arranged in parallel.

In an embodiment of the present disclosure, the encoder may be selectively encode only image data, and audio data is encoded in a central processor of a computing device in which the device for encoding is installed.

In an embodiment of the present disclosure, the out-put section may include multiplexers configured to select and output the data encoded in the encoding section, file storage modules configured to store the data selected from each of the multiplexers as a file in a storage means, and a transmission module configured to transmit the data selected from each of the multiplexers.

The present disclosure has the effect of encoding a multi-channel image using a plurality of hardware encoders, and defining a new configuration parameter and processing a multi-channel image regardless of an interface type of capture card.

DETAILED DESCRIPTION

Figure 1:
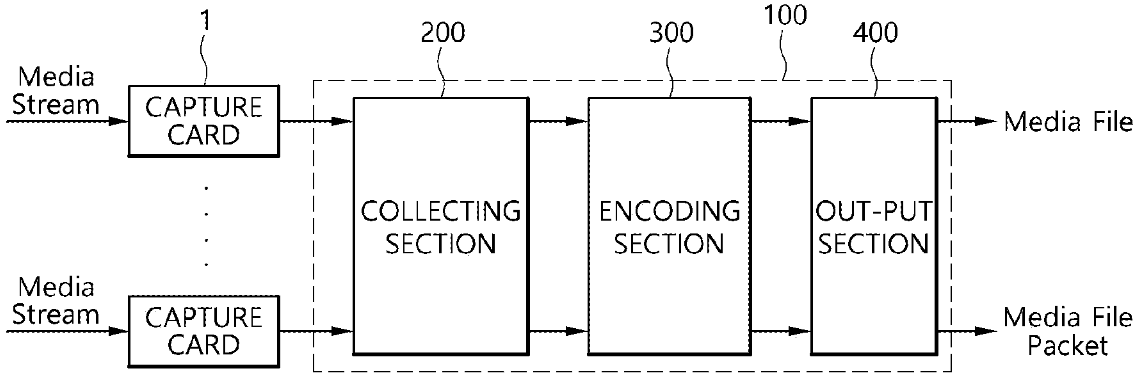
FIG. 1 is a block diagram of a device for encoding a multi-channel image according to a preferred embodiment of the present disclosure.

As hardware for converting analog images into digital images, an image capture card (or board) is used, and it easily converts images from image output devices such as cameras into files that may be edited on a computer.

A typical capture card processes images from each image output device separately, while a specially designed capture card such as Korean Patent No. 10-0776943 (registered on Nov. 9, 2007, High-Performance Video Capture Card and Multi-Channel Video Capture Method) may process a plurality of video sources using a multi-channel video decoder.

However, the video sources may be only available when the types thereof are the same, and this is because a single hardware encoder is used, and the single encoder uses a single configuration parameter.

Therefore, there is a need to develop a multi-channel encoding device capable of processing various images that are not limited to an input interface.

Hereinafter, a device for encoding a multi-channel image of the present disclosure will be described with reference to the accompanying drawings.

The embodiments of the present disclosure are provided to more fully describe the present disclosure to those skilled in the art, and the embodiments described below may be modified in various other forms, and the scope of the present disclosure is not limited to the following embodiments. Rather, these embodiments are provided to further enrich and perfect the present disclosure and to completely convey the spirit of the present disclosure to those skilled in the art.

The terms used herein are used to describe specific embodiments and are not intended to limit the present disclosure. As used herein, the singular forms may include plural forms unless they clearly indicate otherwise. Further, the terms "comprise" and/or "comprising" when used in the specification specify the presence of stated shapes, numbers, steps, operations, members, elements and/or groups thereof, and do not preclude the presence or addition of one or more other shapes, numbers, operations, members, elements and/or groups. As used herein, the term "and/or" includes any and all combinations of the listed items.

Although the terms first, second, etc. are used herein to describe various members, regions, and/or portions, it is apparent that these members, components, regions, layers, and/or portions are not limited by these terms. These terms do not imply a particular order, up or down, or superiority, and are used only to distinguish one member, region or portion from another member, region or portion. Accordingly, a first member, region, or portion to be described below may refer to a second member, region, or portion without departing from the teachings of the present disclosure.

Hereinafter, embodiments of the present disclosure will be described with reference to the accompanying drawings schematically illustrating embodiments of the present disclosure. In the drawings, for example, variations in the shapes depicted may be expected depending on manufacturing technology and/or tolerance. Therefore, an embodiment of the present disclosure should not be construed as being limited to a specific shape of a region shown herein, and should include, for example, a change in shape caused by manufacturing.

FIG. 1 is a block diagram of a device for encoding a multi-channel image according to a preferred embodiment of the present disclosure.

Referring to FIG. 1, the encoding device 100 of the present disclosure includes: an image-collecting section (or an image-collecting processor or a collecting processor) 200 configured to receive images received through each of a plurality of capture cards 1 and convert configuration parameters of the capture cards 1; an encoding section (or an encoding processor) 300 that includes a plurality of encoders configured encode each image data received through the image-collecting section 200 while encoding with reference to the converted configuration parameters; and an out-put section 400 configured to multiplex the data encoded in the encoding section 300 and store or transmit them.

Hereinafter, the configuration and operation of the present disclosure configured as described above will be described in more detail.

First, the encoding device 100 of the present disclosure is added to a computing device for processing images, and is a device for processing images of the plurality of capture cards 1 mounted on the computing device.

Therefore, some of the operations of the encoding device 100 may be performed in a CPU of the computing device, and resources such as memory and data recording unit of the computing device may be used.

The capture card (or board) is installed in the computing device and may be connected in various known ways such as PCIe and USB. In addition, the capture card may be connected to an image output device such as a camera in one or more of various interfaces such as HDMI and SDI to receive and process an image stream.

The capture card 1 is a device for receiving a media stream and converting it into digital data, and the invention is not limited by the type or manner of the capture card 1.

The output data of the capture card 1 is received by the collecting section 200 of the encoding device 100 of the present disclosure.

Figure 2:
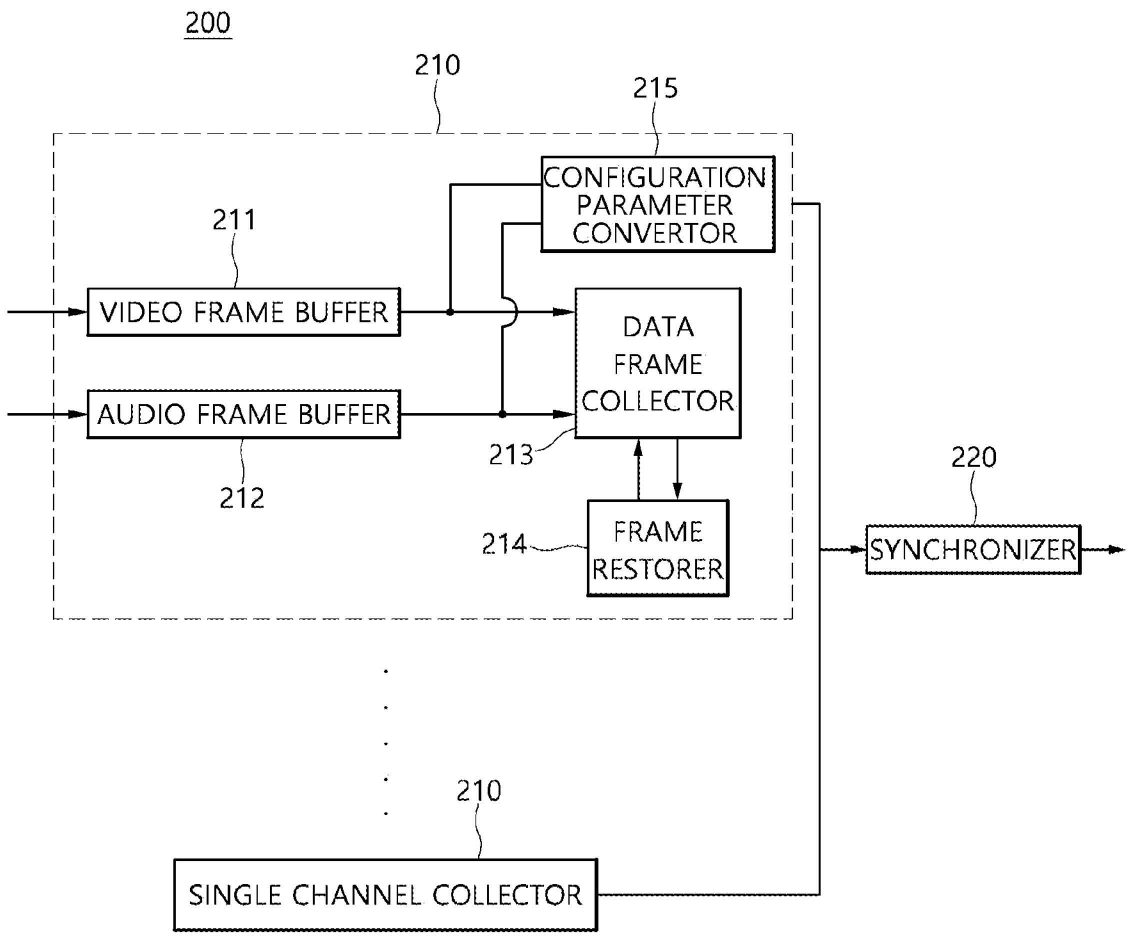
FIG. 2 is a block diagram of a collecting section in FIG. 1.

FIG. 2 is a detailed block diagram of the collecting section 200.

Referring to FIG. 2, the collecting section 200 includes a plurality of single channel collectors 210, and receives individual output data for each capture card 1.

The single channel collector 210 includes a video frame buffer 211, an audio frame buffer 212, a data frame collector 213, and a frame restorer 214 that restores frame loss, and more particularly, includes a configuration parameter convertor 215.

The video frame buffer 211 stores the video pixel data received from the capture card 1 and stores the video pixel data as a frame unit image, and the audio frame buffer 212 stores the audio sample data received from the capture card 1 as a frame unit audio.

In addition, the data frame collector 213 collects and outputs frame unit image data of the video frame buffer 211 and frame unit audio data of the audio frame buffer 212.

In this case, the lost frame is restored by the frame restorer 214.

The frame restorer 214 restores the lost frame by using a known method for restoring image and voice frame. For example, the lost frame may be restored through restoration by time or analysis of the codec's image data structure.

The configuration parameter convertor 215 converts a configuration parameter according to the type of interface that may be different for each capture card 1 into a single configuration parameter.

Specifically, the interface of the capture card 1 may be different, such as HDMI, SDI, DVI, and VGA, and configuration parameters predetermined for each interface are checked to define a new configuration parameter.

Figure 3:
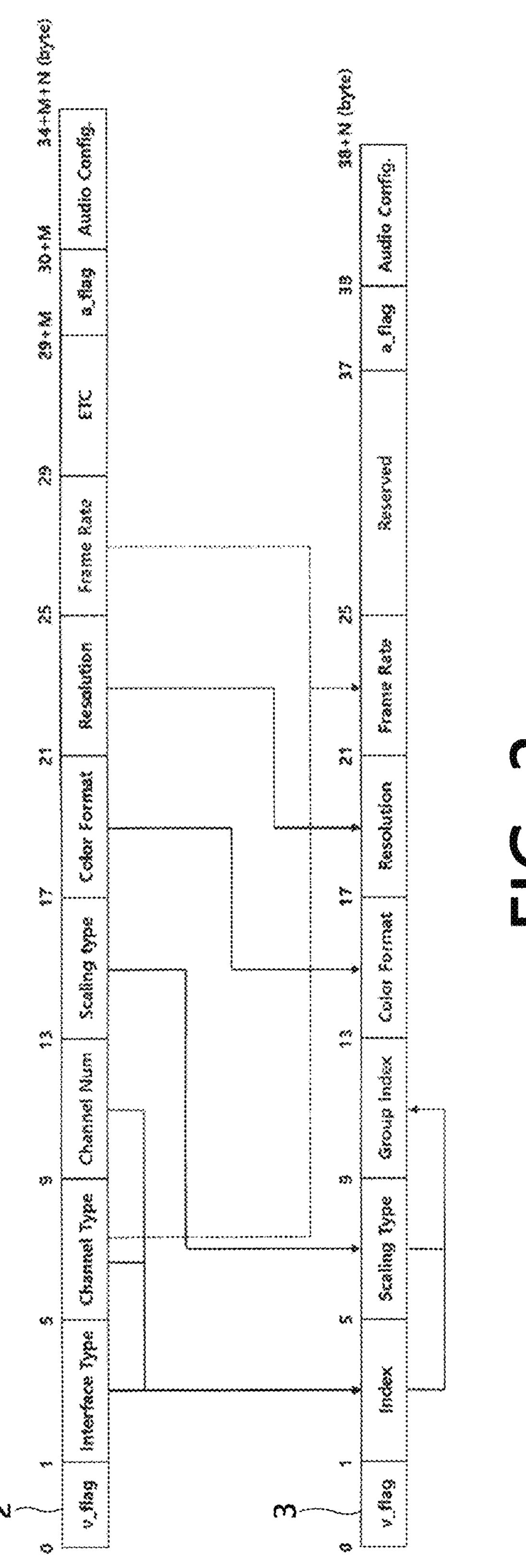
FIG. 3 is an exemplary diagram of a configuration parameter used in the present disclosure.

FIG. 3 is an exemplary diagram of the configuration parameter converted by the configuration parameter convertor 215.

Referring to FIG. 3, the configuration parameter convertor 215 identifies the interface of the capture card 1, and converts the configuration parameter 2 of the capture card 1 into a configuration parameter 3 applied to the present disclosure.

Specifically, the configuration parameter 2 of the present disclosure sequentially includes 1 byte of "v_flag", 4 bytes of "Index", 4 bytes of "Scaling Type", "Group Index", "Color Format", "Resolution", and "Frame Rate", and is composed of 12 bytes of "Reserved", 1 byte of "a_flag", and further includes "Audio Config".

In this configuration, the "v_flag" is a video acquisition support flag, and has a value of true or false, for example. In addition, the "Index" is a video acquisition interface, and is a unique number of channels and is distinguished by IDs such as 0, 1, and 2.

The "Scaling Type" defines a scaling type, which is 2K 4 channels, 4K 1 channel, etc., and is defined as 4 and 16.

The "Group Index" specifies a unique number of each of video interfaces and channels for supporting scaling, each of which specifies a group number and a unique number of 2 bytes.

The "Color Format" is a standard definition for representing pixels, and may be RGBA, YUV422, etc.

The "Resolution" specifies a horizontal and vertical size of a DMS image, and the "Frame Rate" is the number of frames acquired per second, which may be 30, 60, etc.

The "Reserved" of 12 bytes is a reserved space for configuration addition, and the "a_flag" of 1 byte is a value of true or false, as an audio acquisition support flag.

Finally, the "Audio Config" stores audio-related parameters.

In this way, the present disclosure identifies configuration parameters that differ according to the type of interface and changes them into a single configuration parameter that may be used in the present disclosure.

Then, the data collected by the single channel collector 210 is synchronized by the synchronizer 220 and then provided to the encoding section 300.

The encoding section 300 includes a plurality of hardware encoders to encode image data for each channel.

Figure 4:
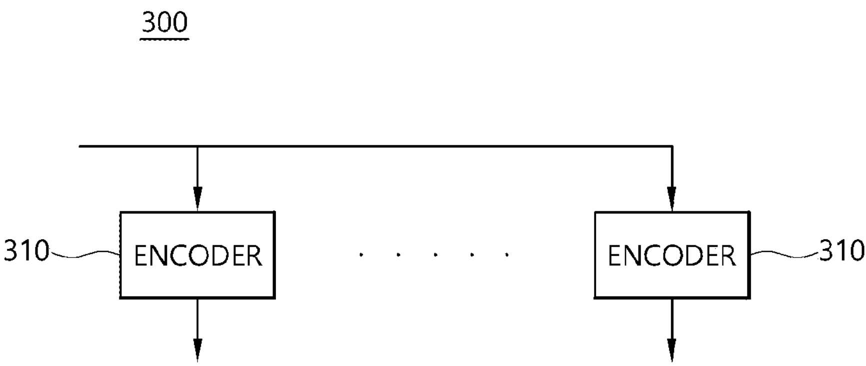
FIG. 4 is a block diagram of an encoding section in FIG. 1.

FIG. 4 is a block diagram of an embodiment of the encoding section 300.

Referring to FIG. 4, the encoding section 300 includes a plurality of encoders 310, and the encoders 310 are the same as the number of channels and are arranged in parallel.

The encoders 310 may encode image and audio data according to the above-described configuration parameters. Each of the encoders 310 generates a multi-session and encodes image frames obtained from a plurality of channels.

At this time, the encoding of the audio data uses very low resources and may be encoded using the CPU of the computing device described above without using the encoder 310. At this time, the audio encoding may also use the same configuration parameters.

As described above, the present disclosure performs encoding using the plurality of hardware encoders 310, but generates a new configuration parameter 3 regardless of the interface of the capture card 1, and performs encoding according to the configuration parameter 3, so that the multi-channel image may be processed regardless of the type of the interface.

The results encoded by each encoder 310 are output through the out-put section 400. At this time, the output means storing or transmitting as a file in the storage means of the computing device.

Figure 5:
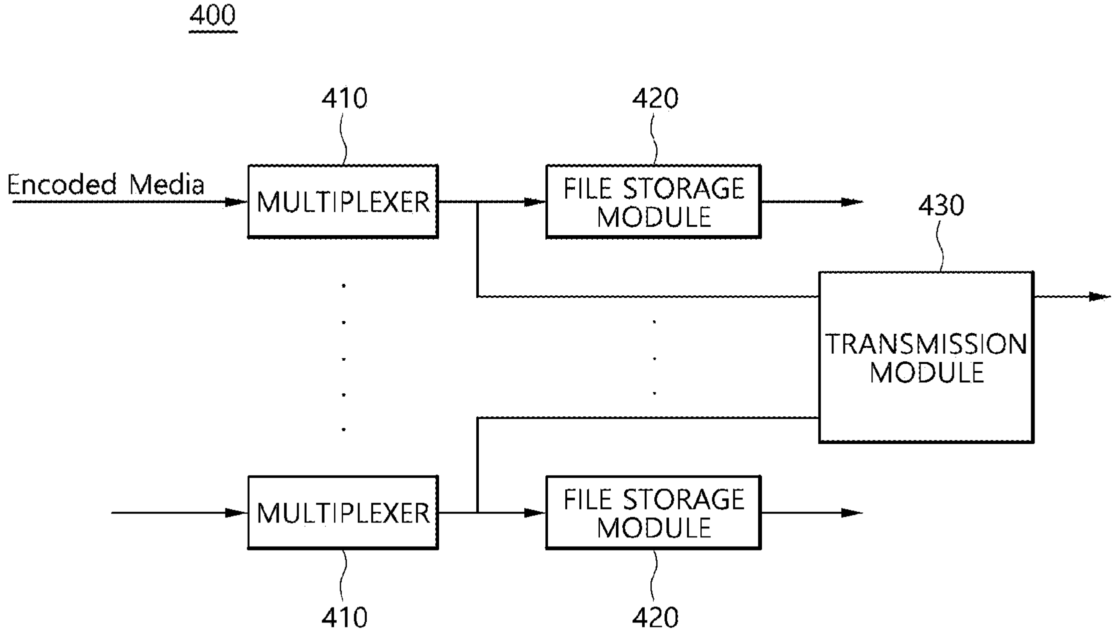
FIG. 5 is a block diagram of an out-put section in FIG. 1.

FIG. 5 is an exemplary view of the out-put section 400.

Referring to FIG. 5, the out-put section may include a plurality of multiplexers 410 configured to select and output encoded data, file storage modules 420 configured to store the output of each of the multiplexers 410 as a file, and a transmission module 430 configured to transmit the output of the plurality of multiplexers 410.

That is, the out-put section 400 may store the encoded image file according to settings or transmit the image file in a streaming manner.

As described above, the present disclosure has a characteristic that data of the capture card having various interfaces may be encoded regardless of the differences in the interfaces.

The present disclosure is not limited to the above embodiments and may be modified and modified in various ways without departing from the technical spirit of the present disclosure.

The present disclosure makes it possible to encode various types of capture card images by utilizing natural laws, and thus has industrial applicability.

What is claimed is:

1. A device for encoding a multi-channel image, comprising:

- a collecting processor configured to collect data of a plurality of capture cards in units of frames;
- an encoding processor configured to encode the data collected in the collecting section using a plurality of encoders, wherein the encoding section encodes the data according to a configuration parameter defined irrespective of interface types of the capture cards; and
- an out-put section configured to output the encoded data,
- wherein the collecting processor includes:
  - a plurality of single channel collectors configured to collect data of each capture card, and
  - a synchronizer configured to synchronize data in units of frames of the plurality of single channel collectors,
- wherein the plurality of single channel collectors include a configuration parameter convertor configured to identify a configuration parameter of each capture card and convert it into the configuration parameter for encoding in the encoding processor, and
- wherein the configuration parameter of each of the capture cards, corresponding to an interface of HDMI, SDI, DVI, or VGA, is configured to be converted into a configuration parameter defined in the order of a video acquisition support flag, a unique number of each interface channel, a scaling type, a unique number of each video interface and channel, a pixel representation definition, an image size, a number of frames per second, a reserved space for configuration addition, an audio acquisition support flag, and an audio-related parameter.

2. The device of claim 1, wherein each of the single channel collectors includes:

- a video frame buffer configured to store image data in units of frames;
- an audio frame buffer configured to store audio data in units of frames; and
- a data frame collector configured to collect and output data stored in the video frame buffer and the audio frame buffer in units of frames.

3. The device of claim 1, wherein the encoding processor is configured such that the plurality of encoders are arranged in parallel.

4. The device of claim 3, wherein each of the encoders is configured to selectively encode only image data, and audio data is encoded in a central processor of a computing device in which the device for encoding is installed.

5. The device of claim 1, wherein the out-put section includes:

- multiplexers configured to select and output the data encoded in the encoding processor;
- file storage modules configured to store the data selected from each of the multiplexers as a file in a storage means; and a transmission module configured to transmit the data selected from each of the multiplexers.

* * * * *